United States Patent Office.

C. E. FOX AND MARY E. FOX, OF GILROY, CALIFORNIA.

*Letters Patent No. 81,992, dated September 8, 1868.*

IMPROVED DYE-STUFF.

*The Schedule referred to in these Letters Patent and making part of the same.*

TO ALL WHOM IT MAY CONCERN:

Be it known that we, C. E. Fox and MARY E. Fox, of Gilroy, Santa Clara county, and State of California, have discovered a new and useful article of commerce for the purpose of dyeing, coloring, painting, and which is a red coloring-matter that we have extracted from the roots of an evergreen shrub or tree, and which is called "mancineta," that grows in many parts of the Pacific States.

The coloring-matter is extracted by first crushing or pulverizing the roots, and then boiling out the coloring-matter.

What we claim as our invention, and desire to secure by Letters Patent, is—

The extract, or coloring-matter, of mancineta, as a new article of manufacture, for its various uses, as herein specified.

C. E. FOX,
MARY E. FOX.

Witnesses:
   WM. D. COFFMAN,
   C. J. COFFMAN.